United States Patent
Kratschmer et al.

(10) Patent No.: US 6,887,970 B2
(45) Date of Patent: May 3, 2005

(54) METHOD FOR PRODUCING POLYCARBONATES

(75) Inventors: Silke Kratschmer, Frankfurt (DE); Uwe Hucks, Alpen (DE); Michael Prein, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/473,316

(22) PCT Filed: Mar. 13, 2002

(86) PCT No.: PCT/EP02/02725

§ 371 (c)(1),
(2), (4) Date: Mar. 3, 2004

(87) PCT Pub. No.: WO02/077067

PCT Pub. Date: Oct. 3, 2002

(65) Prior Publication Data

US 2004/0143088 A1 Jul. 22, 2004

(30) Foreign Application Priority Data

Mar. 26, 2001 (DE) .......................................... 101 14 804

(51) Int. Cl.⁷ .............................................. C08G 64/00
(52) U.S. Cl. ........................ 528/196; 502/164; 528/198
(58) Field of Search .......................... 502/164; 528/196, 528/198

(56) References Cited

U.S. PATENT DOCUMENTS

| | | | |
|---|---|---|---|
| 3,442,854 A | 5/1969 | Curtius et al. | 260/47 |
| 3,888,826 A | 6/1975 | Yamana et al. | 260/47 XA |
| 5,399,659 A | 3/1995 | Kühling et al. | 528/199 |
| 5,412,061 A | 5/1995 | King, Jr. et al. | 528/198 |
| 5,527,875 A | 6/1996 | Yokoyama et al. | 528/196 |
| 5,606,008 A | 2/1997 | Sakashita et al. | 528/199 |
| 5,648,437 A | 7/1997 | Fischer et al. | 526/64 |
| 5,922,826 A * | 7/1999 | Kuze et al. | 528/196 |
| 2002/0188091 A1 * | 12/2002 | Hucks et al. | 528/196 |

FOREIGN PATENT DOCUMENTS

| | | |
|---|---|---|
| EP | 0 564 727 | 10/1993 |
| EP | 0 620 240 | 10/1994 |

* cited by examiner

Primary Examiner—Terressa Boykin
(74) Attorney, Agent, or Firm—Joseph C. Gil; Aron Preis (57) ABSTRACT

The invention relates to a continuous method for producing polycarbonates by transesterifying diaryl carbonates with dihydroxyaryl compounds in the presence of quaternary onium compounds. The invention also relates to polycarbonates produced thereby and products produced from said polycarbonates.

11 Claims, 3 Drawing Sheets

Figure 1:

Residual content of DPC as a function of relative viscosity and Na

○ ppm DPC with Na ● ppm DPC without Na

Temperature in final reactor as a function of relative viscosity and Na

O Temp. with Na ● Temp. without Na

METHOD FOR PRODUCING POLYCARBONATES

The present invention relates to a continuous process for producing polycarbonates by the transesterification of diaryl carbonates with dihydroxyaryl compounds in the presence of quaternary onium compounds, without the addition of alkaline-acting alkali or alkaline-earth catalysts, polycarbonates which can thereby be obtained, and products (applications) of said polycarbonates.

The production of aromatic oligo- or polycarbonates by the melt transesterification process is known from the literature, and has been described previously, for example, in the Encyclopedia of Polymer Science, Vol. 10 (1969), in Chemistry and Physics of Polycarbonates, Polymer Reviews, H. Schnell, Vol. 9, John Wiley and Sons, Inc. (1964), and in DE-C 10 31 512.

In the aforementioned literature references and in the literature information described therein, basic alkali, alkaline-earth and transition metal hydroxides, alkoxides, carbonates, acetates, borohydrides, hydrogen phosphates and hydrides are described as catalysts. These catalysts are selected to be able to achieve better product qualities with lower process temperatures and shorter dwell times. However, these catalysts have the disadvantage that they catalyse secondary reactions which result in defects in the polycarbonate. Defects such as these include defective structures A–D, which are defined below in the text. In addition, the catalysts remain in the polycarbonate and can have an adverse effect on the properties of the polymer because they represent impurities. The aim was therefore to produce, by better processes, a polycarbonate which is as pure as possible, but also light in colour.

Therefore, in order to minimise the addition of these catalysts, they are often used in combination with onium compounds, such as those described in EP-A 673959 or EP-A 694572, for example.

EP-A 671 428 describes the production of a polycarbonate by transesterification in the melt, wherein tetraorganophosphonium carboxylates, which decompose during the production process, are used as catalysts. This patent only describes a discontinuous process, however. A discontinuous process is less susceptible to faults in the case of fluctuating catalyst concentrations or insufficient catalysis. This occurs frequently with this type of catalyst as it decomposes uncontrollably depending on the quality of the raw materials. Impurities can promote or inhibit decomposition. In a fully continuous process, however, the slightest fluctuations in catalysis can result in changes in the build-up of molecular weight during the reaction. In a continuous procedure this can only be compensated for very inadequately or not at all by changing reaction conditions if lapses in quality of the product are to be avoided. Since catalytic fluctuations such as these result in the problems described above when catalysts which readily decompose are used, no fully continuous process has hitherto been known which can be operated without alkali or alkaline-earth catalysts.

Furthermore, the products described in EP-A 671 428 have an extremely high terminal OH group concentration of more than 1000 ppm, in addition to a broad molecular weight distribution which is manifested by the Mw/Mn ratio. It is generally known, however, that the content of remaining terminal OH groups in particular should be kept as low as possible, since they have an adverse effect on thermal stability and on the stability to hydrolysis, and on the behaviour of the products on ageing.

DE 4 238 123 A1 describes a two-stage process for producing polycarbonates by transesterification in the melt using quaternary ammonium or phosphonium compounds as catalysts, in which the temperatures in the first stage are restricted to 260° C. and in the second stage to 295° C. In the first stage, the retention of terminal group ranges is required. In the discontinuous process, the combination of the measures leads to low contents of a branching agent of the type described in the application. A continuous synthesis is not disclosed.

DE A 4 312 390 describes a two-stage process in which small contents of branching agents are obtained with the same chemical structure as in DE 4 238 123 A1. Onium compounds are used as catalysts in the first stage, whilst alkali or alkaline-earth salts are used in the second stage. The reaction times are shortened, so the common adverse effect known to the person skilled in the art, of elevated temperatures on the product quality is avoided. A disadvantage here is the production cost, particularly on an industrial scale for a uniform distribution of the catalyst which subsequently has to be metered in the second stage in the polymer matrix. Local excess concentrations of catalyst cannot be ruled out, however, and can result in products which are locally highly branched and are then contained in the polycarbonate as sources of swelling. These swelling elements form defects in the polymer matrix and limit the use of products made therefrom. Moreover, the metal catalysts which are added in the process described in DE A 4 312 390, such as alkali and alkaline-earth salts, are also disadvantageous, because they remain in the product. They have to be deactivated by means of suitable additives once polycondensation has ended, whereby further ions are introduced.

The object of the present invention, however, is to employ polycarbonates which are substantially free from electrolytes or which at least have a low content of electrolytes, i.e. which are substantially free from ions or which at least have a low content of ions, for today's applications in the electronics field and for storage media. In the sense of the present invention, a low content of electrolyte means polycarbonates which have an alkali and alkaline-earth content <60 ppb, preferably <40 ppb, more preferably <20 ppb.

It has surprisingly been found that with a continuous procedure the entire process can be carried out without the presence of alkaline-acting alkali or alkaline-earth metal-containing catalysts in a plurality of stages with high temperatures and high residence times, in particular towards the end of the process in the polycondensation stage with economic throughputs, with the selection of suitable reactors, without an increase in the formation of terminal OH groups, branching agents or defective structure formation and colour losses. Furthermore, in contrast to EP-A 671 428 an improved molecular weight distribution is achieved.

When catalysis is effected by catalysts which contain alkali or alkaline-earth metals, the temperatures and the residence time during polycondensation are lower in the final stage. It is therefore particularly surprising that in the process according to the invention, despite elevated temperatures and increased residence times, better product colours are obtained.

The present invention claims a continuous process for producing polycarbonates by the transesterification of diaryl carbonates with dihydroxyaryl compounds, characterised in that condensation is carried out in the presence of quaternary onium compounds as catalysts, wherein the final condensation stage is effected without further addition of catalysts.

This continuous process for producing polycarbonates by the transesterification of diaryl carbonates with dihydroxyaryl compounds is preferably characterised in that, using catalysts which can be decomposed leaving substantially no residue, after a preliminary condensation without separation of the monohydroxyaryl compound formed, and in a plurality of subsequent flash/evaporator stages in which the temperature is increased stepwise and the pressure is decreased stepwise, an oligocarbonate is produced which is thereafter condensed to form the finished polycarbonate in one or more successive basket-type reactors, without the addition of further amounts of the catalyst used or of a new, different catalyst, whilst the temperature is further elevated and the pressure is further reduced. Under the selected reaction conditions the catalysts decompose substantially without leaving a residue. The term "substantially without leaving a residue" is to be understood to mean that catalyst residues, for example phosphorus compounds, cannot be detected in the finished polycarbonate, and the cleavage products are found practically quantitatively in the condensates from the process. The detectable limit of the phosphorus in the finished polycarbonate is 1 ppm.

Over the entire process, the temperatures range between 180 and 330° C., and the pressures range between 15 bar absolute and 0.01 mbar.

In order to carry out the process the reactants can either be melted together or the solid dihydroxyaryl compound can be dissolved in the diaryl carbonate melt or the solid diaryl carbonate can be dissolved in the dihydroxyaryl compound melt or both raw materials can be combined as a melt which is preferably obtained directly from production. The residence times of the melts, particularly those of dihydroxyaryl compound melts, are selected to be as short as possible. The melt mix, on the other hand, can remain for longer at correspondingly low temperatures, without damage, owing to the reduced melting point of the raw material mix compared to the individual raw materials. The catalyst, dissolved in phenol, is then admixed and the melt is heated to the reaction temperature. At the beginning of the industrially significant process to produce polycarbonate from bisphenol A and diphenyl carbonate, this is 180 to 220° C., preferably 190 to 210° C., more preferably 190° C. With residence times of 15 to 90 min, preferably 30 to 60 min, the reaction equilibrium is adjusted without the hydroxyaryl compound formed being removed. The reaction can be carried out at atmospheric pressure, but also for industrial reasons at excess pressure. The preferred pressure in industrial installations is 2 to 12 bar.

The molten mixture is flashed into a first vacuum chamber, the pressure in which is set to 100 to 400 mbar, preferably 150 to 300 mbar, and directly thereafter is heated to its inlet temperature again in a suitable apparatus at the same pressure. In the flashing process the hydroxyaryl compound occurring is evaporated with monomers which are still present.

After a residence time of 5 to 30 minutes in a container vessel optionally with pumped circulation, the reaction mixture is flashed into in a second vacuum chamber, the pressure in which is 50 to 200 mbar, preferably 80 to 150 mbar, and directly thereafter is heated to a temperature of 190 to 250° C., preferably 210 to 240° C., particularly preferably 210 to 230° C., in an apparatus at the same pressure.

Here, too, hydroxyaryl compound occurring is evaporated with monomers still present.

After a residence time of 5 to 30 min in a container vessel optionally with pumped circulation, the reaction mixture is flashed at the same pressure and temperature into a third vacuum chamber, the pressure in which is 30 to 150 mbar, preferably 50 to 120 mbar, and directly thereafter is heated to a temperature of 220 to 280° C., preferably 240 to 270° C., particularly preferably 240° C. to 260° C. in a suitable apparatus at the same pressure. Here, too, hydroxyaryl compound occurring is evaporated with monomers still present.

After a residence time of 5 to 20 min in a container vessel optionally with pumped circulation, the reaction mixture is flashed at the same pressure and temperature into a further vacuum chamber, the pressure in which is 5 to 110 mbar, preferably 15 to 100 mbar, particularly preferably 20 to 80 mbar, and directly thereafter is heated to a temperature of 250 to 300° C., preferably 260 to 290° C., particularly preferably 260° to 280° C. in a suitable apparatus at the same pressure. Here, too, hydroxyaryl compound occurring is evaporated with monomers still present, optionally with pumped circulation.

The number of these stages, which is 4 here for example, can vary between 2 and 6. The relative viscosity of the oligomer which is attained in these stages ranges between 1.04 and 1.20, preferably between 1.05 and 1.15, particularly preferably between 1.06 to 1.10 The relative viscosity is determined as the ratio of the viscosity of the solvent to the viscosity of the polymer dissolved in said solvent. It was determined in dichloromethane at a concentration of 5 g/liter at 25° C.

The oligomer produced in this way after a residence time of 5 to 20 minutes in a container vessel optionally with pumped circulation is conveyed at the same pressure and same temperature as in the last flash/evaporation stage into a basket-type reactor and further condensed at 250 to 310° C., preferably 250 to 290° C., particularly preferably 250 to 280° C., at pressures of 2 to 15 mbar, preferably 4 to 10 mbar, at residence times of 30 to 90 min, preferably 30 to 60 min. The product attains a relative viscosity of 1.12 to 1.25, preferably 1.13 to 1.22, particularly preferably 1.13 to 1.20.

The melt leaving this reactor is brought to the desired final viscosity in a further basket-type reactor. The temperatures are 270 to 330° C., preferably 280 to 320° C., particularly preferably 280 to 310° C., the pressure is 0.01 to 3 mbar, preferably 0.2 to 2 mbar, at residence times of 60 to 180 min, preferably 75 to 150 min. The relative viscosities are set to the level required for the proposed application and are 1.18 to 1.40, preferably 1.18 to 1.36, particularly preferably 1.18 to 1.34.

The function of the two basket-type reactors may also be combined into one basket-type reactor.

The vapours are directly removed from all the process stages and processed, for example, according to German patent application No. 1 01 00 404.

Depending on the course of the process, suitable apparatuses and reactors for the individual process steps include heat exchangers, apparatuses or agitated vessels which provide the requisite residence time at constant temperature; flashing apparatuses such as vessels of large volume, separators or cyclones, stirred vessels, rotary evaporators, falling film evaporators or other commercially available apparatuses, allowing the necessary heat input; containers which ensure the requisite residence times after heating; single- or double-shaft basket-type or disc reactors having the requisite volumes and film formation areas, and a construction which is appropriate for the increasing melt viscosities.

The pipelines between apparatuses should of course be as short as possible, and bends in the lines should be kept as slight as possible. The general external constraints for assembling chemical installations have to be taken into consideration in this respect.

In a preferred embodiment of the process a conventional heat exchanger is used for heating the molten raw materials. A perforated tray column is used as a residence vessel for achieving reaction equilibrium. The flashing processes, i.e. the flash evaporation operations, are carried out in centrifugal separators, preferably in cyclones, or are carried out in deflector separators. The melt flowing from the centrifugal separators, preferably cyclones or deflector separators is heated in falling film evaporators which are followed by vessels for adjusting the residence times. The vessels are provided with pumped circulation, the liquids from the falling film evaporator and the circulation flowing over the fitted grid or perforated metal sheet constructions or packings into the bottom and being collected. Condensation into a medium-viscosity product is carried out in a disc or basket-type reactor. Polycondensation is also carried out in a disc or basket-type reactor which with high residence times provides a very large surface which is continuously renewed under vacuum. The disc or basket-type reactors are geometrically formed according to the increase in the melt viscosity. One disc or basket-type reactor may be sufficient in a special arrangement. Examples of reactors which are suitable are those described in DE 4 447 422 C2 or two-shaft reactors as described in WO A 99/28 370.

Particularly suitable materials for producing the apparatus, reactors, pipelines, pumps and fittings are stainless steels of the type Cr Ni (Mo) 18/10 and for example 1.4571 or 1.4541 (Stahlschlüssel 2001, Publisher: Stahlschlüssel Wegst GmbH, Th-Heuss-Straße 36, D-71672 Marbach) and Ni base alloys of the type C, such as for example 2.4605 or 2.4610 (Stahlschlüssel 2001, Publisher: Stahlschlüssel Wegst GmbH, Th-Heuss-Straße 36, D-71672 Marbach). The stainless steels are used up to processing temperatures of about 290° C. and the Ni base alloys at processing temperatures above about 290° C.

The present invention also relates to the thermoplastic polycarbonates which can be obtained by the process according to the invention. These have an extremely low content of cations and anions, which are each less than 60 ppb, preferably <40 ppb, more preferably <20 ppb, wherein the cations exist as those of alkali and alkaline-earth metals which can originate, for example, as impurities from the raw materials used and from phosphonium and ammonium salts. Further ions such as Fe, Ni, Cr, Zn, Sn, Mo, Al ions and their homologues can be contained in the raw materials or originate from abrasion or corrosion of the materials of the installation employed. The content of these ions is in total less than 2 ppm, preferably less than 1 ppm and particularly preferably less than 0.5 ppm.

Therefore the smallest quantities are aimed for which can be achieved by use of the purest raw materials. Pure raw materials of this type are for example obtainable only after purification processes such as recrystallisation, distillation, precipitation and washing, etc.

The anions which are present are those of inorganic and organic acids in equivalent amounts (for example chloride, sulphate, carbonate, phosphate, phosphite, oxalate, etc.).

The polycarbonates are distinguished in that they have no detectable quantities of cleavage products or decomposition products with reactive terminal groups formed during the transesterification process. Cleavage or decomposition products of this type are for example isopropenylmonohydroxyaryls or the dimers thereof.

The weight average molecular weights which are obtained range from 15,000 to 40,000, preferably from 18,000 to 36,000, more preferably from 18,000 to 34,000, wherein the weight average molecular weight is determined via the relative viscosity.

The content of terminal OH groups in the polycarbonates which can be obtained by the process according to the invention ranges between 50 and 750 ppm, preferably between 70 and 500 ppm, more preferably between 90 and 300 ppm.

The content of defective structures A–D in the polycarbonate is determined by HPLC after complete saponification. For this purpose, the polycarbonate is saponified by boiling it with sodium methylate, and is subsequently acidified, filtered, and evaporated to dryness. The residue is dissolved in acetonitrile and is detected by HPLC.

The polycarbonate according to the invention corresponds to formula (1)

(1)

wherein the brackets represent a recurring structural unit,
wherein M can be Z or a defective structure A, B, C and/or D,
wherein Z represents an aromatic radical which is described below,
wherein defective structure A is present in a proportion which does not exceed 800 ppm
preferably 750 ppm
more preferably 500 ppm, wherein defective structure B
is present in a proportion which does not exceed 350 ppm
preferably 250 ppm
more preferably 70 ppm,
wherein defective structure C is present in a proportion which does not exceed 200 ppm
preferably 150 ppm more preferably 60 ppm, wherein defective structure D is present in a proportion which does not exceed 750 ppm
preferably 300 ppm
more preferably 150 ppm,
wherein Y denotes H or wherein R independently of one another can denote the same or different radicals, H, $C_1$–$C_{20}$ alkyl, $C_6H_5$ and $C(CH_3)_2C_6H_5$, and
n represents 0, 1 or 2, wherein X denotes Y or -(MOCOO)Y, and
M and Y have the meanings described above.

The sum of all the defective structures A–D should not exceed 1.000 ppm, preferably 700 ppm, more preferably 550 ppm.

Compared with the prior art the process has the following surprising advantages:

Despite decomposition of the catalyst being difficult to control, polycarbonates which can be reproduced by this continuous process are obtained which have the desired molecular weights, low contents of defective structures, low, non-detectable traces of incorporated cleavage or decomposition products from the transesterification process, minimal quantities of alkali or alkaline-earth compounds and a low content of terminal OH groups. The polycarbonates are also distinguished in that they no longer contain detectable quantities of catalyst or catalyst radicals, for example phosphorus compounds.

Since no alkali or alkaline-earth metal cations are present which would otherwise be present in the polycondensation stage, the measure of deactivating the catalyst after the formation of polycarbonate is complete, whereby further ions would be introduced, can be omitted.

The content of diaryl carbonates in the finished polycarbonate is appreciably less than when the polycondensation in the last reaction step is conducted in the presence of catalysts, for example catalysts which contain alkali or alkaline-earth metals.

Defective structures which originate from secondary reactions, particularly branched structures of formulae A–D, are present only in surprisingly small amounts, and in contrast to polycarbonates which can otherwise be obtained by the melt transesterification process do not result in increased melt viscosities (structural viscosity), so that these products are thus equivalent to products obtained by the solution process.

The polycarbonate which is obtainable by the process according to the invention thus differs considerably from the polycarbonates known hitherto which have been produced by the transesterification process, in which the catalyst is active over the entire process or is added for subsequent polycondensation after oligocondensation is complete.

The attainment of a high quality product is particularly surprising, because, compared with a procedure involving lower temperatures and shorter residence times, which is only possible here in the presence of catalysts which contain alkali and/or alkaline-earth salts, it is achieved by a procedure involving a higher temperature and longer residence times. Under conditions where the product is subjected to a higher degree of thermal stress for a longer period, however, one skilled in the art would expect a loss of quality with regard to the colour of the product and the content of defective structures. Surprisingly, these problems do not occur when employing the process according to the invention. One skilled in the art who starts from the prior art with the aim of producing polycarbonates which are low in or substantially free from electrolytes by polycondensation, namely in the last step of the process, without a further addition of catalyst, would therefore scarcely imagine that this could be achieved by higher temperatures and longer residence times.

Dihydroxyaryl compounds which are suitable for the process according to the invention are those of formula (II)

$$HO\text{-}Z\text{-}OH \qquad (II)$$

where Z is an aromatic radical which comprises 6 to 30 C atoms and which can contain one or more aromatic nuclei, and which can be substituted and can contain aliphatic or cycloaliphatic radicals, or alkylaryl groups or hetero atoms as bridging members.

Examples of dihydroxyaryl compounds of formula (II) include hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
α,α'-bis-(hydroxyphenyl)-diisopropylbenzenes, as well as compounds thereof which contain alkylated and halogenated nuclei.

These and other suitable dihydroxyaryl compounds are described, for example, in U.S. Pat. Nos. 3,028,365, 3,148,172, 3,275,601, 2,991,273, 3,271,367, 3,062,781, 2,970,131 and 2,999,846; in DE-A 1 570 703, 2 063 050, 2 063 052 and 2211 0956; in French Patent Specification 1 561 518; and in the monograph by H. Schnell entitled "Chemistry and Physics of Polycarbonates", Interscience Publishers, New York 1964.

Examples of preferred dihydroxyaryl compounds include:

4,4'-dihydroxydiphenyl,
2,2-bis-(4-hydroxyphenyl)propane;
2,4-bis-(4-hydroxyphenyl)-2-methylbutane,
1,1-bis-(4-hydroxyphenyl)cyclohexane,
1,1-bis-(4-hydroxyphenyl)-4-methylcyclohexane,
α,α'-bis-(4-hydroxyphenyl)-p-diisopropylbenzene,
α,α'-bis-(4-hydroxyphenyl)-m-diisopropylbenzene,
bis-(4-hydroxyphenyl)sulphone,
bis-(4-hydroxyphenyl)methane,
1,1-bis-(4-hydroxyphenyl)-3,3,5-trimethylcyclohexane,
bis-(2,6-dimethyl-4-hydroxyphenyl)propane,
bis-(4-hydroxyphenyl)hexafluoropropane,
(4-hydroxyphenyl)-1-phenylethane,
(4-hydroxyphenyl)diphenylmethane, dihydroxydiphenylether,
4,4'-thiobisphenol,
bis-(4-hydroxyphenyl)-1-(1-naphthyl)ethane,
bis-(4-hydroxyphenyl)-1-(2-naphthyl)ethane,
dihydroxy-3-(4-hydroxyphenyl)-1,1,3-trimethyl-1H-inden-5-ol,
dihydroxy-1-(4-hydroxyphenyl)-13,3-trimethyl-1H-inden-5-ol,
2,2',3,3'-tetrahydro-3,3,3',3'-tetramethyl-1,1'-spirobi-[1H-inden]-5,5'-diol.

The following are particularly preferred:

resorcinol,
bis-(4-hydroxyphenyl)-1-(1-naphthyl)ethane,
bis-(4-hydroxyphenyl)-1-(2-naphthyl)ethane,
2,2-bis-(4-hydroxyphenyl)propane
α,α'-bis-(4-hydroxyphenyl)-p-diisopropylbenzene,
α,α'-bis-(4-hydroxyphenyl)-m-diisopropylbenzene,
1,1-bis-(4-hydroxyphenyl)cyclohexane,
bis-(4-hydroxyphenyl)-3,3,5-trimethylcyclohexane,
bis-(4-hydroxyphenyl)diphenylmethane.

The following are more particularly preferred:

bis-(4-hydroxyphenyl)-3,3,5-trimethylcyclohexane,
4,4'-dihydroxydiphenyl,
2,2-bis-(4-hydroxyphenyl)propane.

Either a dihydroxyaryl compound of formula (II) can be used, with the formation of homopolycarbonates, or a plurality of dihydroxyaryl compounds of formula (II) can be used, with the formation of copolycarbonates.

The dihydroxyaryl compounds which have residual contents of the monohydroxyaryl compounds from which they were produced can also be used.

The content thereof can be up to 20%, preferably 10%, more preferably to 5% and particularly preferably up to 2%.

Diaryl carbonates in the sense of the present invention are those of formula (III)

(III)

and of formula (IV), (IV)

wherein R, R' and R", independently of each other, can represent H, or $C_1$–$C_{34}$ alkyl/cycloalkyl, $C_7$–$C_{34}$ alkaryl or $C_6$–$C_{34}$ aryl, for example diphenyl carbonate, butylphenyl-phenyl carbonate, di-butylphenyl carbonate,
isobutylphenyl-phenyl carbonate, di-isobutylphenyl carbonate,
tert-butylphenyl-phenyl carbonate, di-tert-butylphenyl carbonate,
n-pentylphenyl-phenyl carbonate, di-(n-pentylphenyl) carbonate,
n-hexylphenyl-phenyl carbonate, di-(n-hexylphenyl) carbonate,
cyclohexylphenyl-phenyl carbonate, di-cyclohexylphenyl carbonate,
phenylphenol-phenyl carbonate, di-phenylphenol carbonate,
isooctylphenyl-phenyl carbonate, di-isooctylphenyl carbonate,
n-nonylphenyl-phenyl carbonate, di-(n-nonylphenyl) carbonate,
cumylphenyl-phenyl carbonate, di-cumylphenyl carbonate,
naphthylphenyl-phenyl carbonate, di-naphthylphenyl carbonate,
di-tert-butyl phenyl-phenyl carbonate, di-(di-tert-butylphenyl)carbonate,
dicumylphenyl-phenyl carbonate, di-(dicumylphenyl) carbonate,
4-phenoxyphenyl-phenyl carbonate, di-(4-phenoxyphenyl) carbonate,
3-pentadecylphenyl-phenyl carbonate, di-(3-pentadecylphenyl)carbonate,
tritylphenyl-phenyl carbonate, di-tritylphenyl carbonate, preferably diphenyl carbonate,
tert-butylphenyl-phenyl carbonate, di-tert-butyl phenyl carbonate,
phenylphenol-phenyl carbonate, di-phenylphenol carbonate,
cumylphenyl-phenyl carbonate, di-cumylphenyl carbonate,
more preferably diphenyl carbonate.

The diaryl carbonates may also be used with residual contents of the monohydroxyaryl compounds from which they were produced. The contents may be up to 20%, preferably 10%, particularly preferably up to 5% and more particularly preferably up to 2%.

Furthermore the phenolic compounds used as carbonates can also be used directly as monohydroxyaryl compounds in addition to the aforementioned carbonates to influence the terminal groups of the polycarbonate. A monohydroxyaryl compound should be selected of which the boiling point is above that of the monohydroxyaryl compound from which the diaryl carbonate was formed. Preferred mixtures are those containing diphenylcarbonate. According to the process of the invention there is the possibility of adding the monohydroxyaryl compound at any point of the reaction, preferably at the beginning of the reaction and the addition can be divided into a plurality of portions. The content of free monohydroxyaryl compound may be 0.4 to 17 mol %, preferably 1.3 to 8.6 mol % (based on the dihydroxyaryl compound). The addition can be made here before the reaction or completely or partially during the reaction.

Based on the dihydroxyaryl compound, the diaryl carbonates are used in an amount of 1.02 to 1.30 mol, preferably 1.04 to 1.26 mol, particularly preferably 1.06 to 1.22 mol, per mole of dihydroxyaryl compound. Mixtures of the aforementioned diaryl carbonates can also be used.

Ammonium or phosphonium catalysts are used for the synthesis. For the purpose of the present application, these are also jointly designated as onium compounds. They are preferably used in amounts of $10^{-8}$ to $10^{-3}$ mol, more preferably in amounts of $10^{-7}$ to $10^{-4}$ mol, with respect to one mol dihydroxyaryl compound.

Phosphonium salts can be used as catalysts for the production of the polycarbonates according to the invention, and can optionally be used in combination with other suitable catalysts which do not result in too high a content of defective structures A–D and which decompose at elevated temperatures, such as other onium compounds for example.

Phosphonium salts in the sense of the invention are those of formula (VII), wherein $R^{1-4}$ can represent the same or different $C_1$–$C_{10}$ alkyls, $C_6$–$C_{10}$ aryls, $C_{10}$–$C_{10}$ aralkyls or $C_5$–$C_6$ cycloalkyls, preferably methyl or $C_6$–$C_{14}$ aryls, more preferably methyl or phenyl, and $X^-$ can be an anion such as hydroxide, sulphate, hydrogen sulphate, hydrogen carbonate, carbonate, a halide, preferably chloride, or an alkoxide of formula OR, wherein R may be a $C_6$–$C_{14}$ aryl or a $C_7$–$C_{12}$ aralkyl group, preferably phenyl. Compounds such as these are described in "Houben Weyl, Prozessen der organischen Chemie", Thieme Verlag Stuttgart, 4th Edition, 1963, Vol. 12.1, pages 47, 107–147, as thermally labile phosphonium salts. The preferred catalysts are:

tetraphenylphosphonium chloride,
tetraphenylphosphonium hydroxide,
tetraphenylphosphonium phenolate,
more preferably tetraphenylphosphonium phenolate.

Preferred quantities of phosphonium salt catalysts are $10^{-8}$ to $10^{-3}$ mol per mol of diphenol and the more preferred catalyst quantities are $10^{-7}$ to $10^{-4}$ mol per mol of diphenol.

The catalysts are added in solution to avoid dangerous over-concentrations in dosing. The solvents are system and process inherent compounds such as, for example, dihydroxyaryl compounds, diaryl carbonates or monohydroxyaryl compounds. Particularly preferred are monohydroxyaryl compounds as it is well known to the person skilled in the art that the dihydroxyaryl compounds and diaryl carbonates easily change and decompose even at slightly elevated temperatures, in particular under the action of catalysts. The resultant compounds reduce the polycarbonate quality. The preferred compound is phenol in industrially significant transesterification processes to produce polycarbonate. Phenol is an imperative choice because the selected catalyst tetraphenylphosphoniumphenate is isolated during production as a mixed crystal with phenol.

The ammonium and phosphonium compounds are removed by thermal decomposition. The cleavage products occur in the distillate, and catalyst residues can no longer be detected in the polycarbonate (detectable limit 1 ppm). The main proportion of the cleavage products consists of triphenylphosphine and triphenylphosphine oxide.

The polycarbonates can deliberately be branched and can therefore contain small amounts ranging from 0.02 to 3.6 mol % (with respect to the dihydroxyaryl compound) of branching agents. Suitable branching agents include compounds which are suitable for the production of polycarbonate and which contain three or more functional groups, preferably those with three or more than three phenolic OH groups, for example 1,1,1-tri-(4-hydroxyphenyl)ethane and isatin-bis-cresol.

Residual contents of monomers caused by the chemical equilibrium and by process parameters such as temperature, pressure and residence time may if necessary be further reduced by suitable evaporation processes.

To change the properties, auxiliary and reinforcing materials can be added to the polycarbonates according to the invention. Examples of these are: heat stabilisers, UV stabilisers, flow agents, mould release agents, fire retardants, pigments, finely divided minerals, fibrous substances, for example alkyl and aryl phosphites, phosphates, phosphanes, low molecular weight esters of carboxylic acids, halogen compounds, salts, chalk, quartz flour, glass and carbon fibres, pigments and combinations thereof. Compounds such as these are described, for example, in WO-A 99/55772, pages 15–25, and in "Plastics Additives", by R. Gächter and H. Müller, Hanser Publishers 1983.

Furthermore, other polymers can also be admixed with the polycarbonates according to the invention, e.g. polyolefins, polyurethanes, polyesters, acrylonitrile-butadiene-styrene and polystyrene.

These substances are preferably added to the finished polycarbonate in conventional processing units, but can be added during a different stage of the production process depending on the requirements.

The polycarbonates which can be obtained by the process according to the invention can be processed in the usual manner in conventional machines, e.g. in extruders or injection moulding machines, to form shaped articles such as films or sheeting.

Possible applications of the polycarbonates according to the invention are as follows:

1. Sheets of safety glass which, as is known, are necessary in many areas of buildings, vehicles and aircraft, and which are also used for the visors of helmets.
2. The production of extruded films and films formed from solution for displays or electric motors, and also films for skiing.
3. The production of blown articles (see U.S. Pat. No. 2,964,794, for example).
4. The production of transparent sheeting, particularly cavity sheeting, for the cladding of buildings such as railway stations, greenhouses and lighting installations.
5. The production of traffic light housings or traffic signs.
6. The production of foamed materials (see DE-B 1 031 507, for example).
7. The production of fibres and filaments (see DE-B 1 137 167 and DE-A 1 785 137, for example).
8. Translucent plastics with a content of glass fibres for photometric purposes (see DE-A 1 554 020, for example).
9. The production of precision injection moulded parts, such as lens holders for example. Polycarbonate with a content of glass fibres is used for this purpose, and optionally additionally contains about 1–10% by weight $MoS_2$ based on its total weight.
10. Optical applications such as optical storage media (CDs, DVDs), safety spectacles or lenses for photographic and film cameras (see DE-A 2 701 173, for example).
11. Light transmission supports, particularly optical fibre cables (see EP-A1 0 089 801, for example).
12. Electrical insulation materials for electrical conductors and for plug housings and plug-in connectors.
13. As a support material for organic photoconductors.
14. The production of lamps, e.g. headlamps, lens covers or lamp covers.
15. Medical applications, e.g. oxygenators, dialysers.
16. Foodstuff applications, such as bottles, crockery and chocolate moulds.
17. Applications in the automotive industry, where contact with fuels and lubricants can occur.

18. Articles for sports, such as slalom poles for example.
19. Domestic articles such as kitchen sinks and letterbox housings.
20. For casings, e.g. electricity distribution boxes, electrical appliances, domestic appliances.
21. Components of domestic articles and of electrical and electronic appliances.
22. The production of motorcycle helmets and safety helmets.
23. Parts of automobiles, such as window glass, dashboards, bodywork parts and shock absorbers.
24. Other applications such as feeding doors for stables or animal cages.

In particular, the polycarbonates according to the invention are suitable for use in the field of electronics, especially for optical, magneto-optic and other data storage media.

The present invention also relates to products made from the polycarbonate according to the invention.

EXAMPLE 1

94.7 kg/hour of a molten mixture consisting of 49.8 kg diphenyl carbonate/hour (232.7 mol/hour) and 44.9 kg bisphenol A/hour (196.9 mol/hour), with the addition of 0.0034 kg tetraphenylphosphonium phenolate/hour (0.0079 mol/hour) dissolved in 0.1 kg phenol/hour were pumped from a container through a heat exchanger, and were heated to 190° C. and passed through a residence column. The mean residence time was 45 minutes.

The melt was then led, via a flashing valve, into a separator at a pressure of 200 mbar. The melt flowing therefrom was heated to 190° C. again in a falling film evaporator, which was also maintained at 200 mbar, and was caught in a container. After a residence time of 20 minutes, the melt was pumped into the next three stages of identical construction. The conditions in the $2^{nd}/3^{rd}/4^{th}$ stages were 80/50/25 mbar; 230/250/270° C. and 20/10/10 minutes. The oligomer formed had a relative viscosity of 1.068. All the vapours were passed via pressure controllers into a column maintained under vacuum, and were taken off as a condensate.

The oligomer was subsequently condensed in a basket-type reactor at 270° C. and 7.3 mbar, and with a residence time of 45 minutes, to form a high molecular weight oligomer. The relative viscosity thereof was 1.134. The vapours were condensed.

The oligomer was condensed in a further basket-type reactor at 311° C. and 1.0 mbar to give a relative viscosity of 1.277. The mean residence time was determined as 130 minutes. The vapours were condensed downstream of or in the vacuum apparatus.

The polycarbonate contained 245 ppm of terminal OH groups, and the following contents of branched species were measured: structure A: 226 ppm; structure B: 6 ppm; structure C: <5 ppm; structure D: 138 ppm.

An amount of phosphorus corresponding to 0.000234 kg/hour was detected in the combined condensates from the vapour streams. This was equivalent to 96.3% of the amount of catalyst used (=0.000243 kg/hour). Accordingly, no significant amounts of catalyst residues or decomposition products remained in the product. Phosphorus could not be detected in the polycarbonate (below 1 ppm).

EXAMPLES 2 TO 8

By varying the ratio of diphenyl carbonate to bisphenol A, polycarbonates were produced which contained comparable terminal OH groups but which had different relative viscosities. Apart from the vacuum, all the conditions such as throughput, catalyst and temperature remained constant in these tests. The results are given in Table 1.

TABLE 1

| Test | Rel. viscosity | ppm OH | ppb Na | Temp. of final reactor | Yl | ppm DPC |
|---|---|---|---|---|---|---|
| 2 | 1.202 | 290 | 0 | 310 | 3.54 | 553 |
| 3 | 1.203 | 280 | 0 | 310 | 3.77 | 534 |
| 4 | 1.218 | 290 | 0 | 310 | 3.23 | 444 |
| 5 | 1.253 | 290 | 0 | 310 | 3.00 | 268 |
| 6 | 1.274 | 280 | 0 | 310 | 2.92 | 217 |
| 7 | 1.277 | 230 | 0 | 311 | 2.77 | 227 |
| 8 | 1.287 | 250 | 0 | 311 | 2.69 | 195 |

COMPARATIVE EXAMPLES 9 to 14

In a further series of tests, the same solution of tetraphenylphosphonium phenolate in phenol, which was enriched with different amounts of sodium phenolate/hour, however, was fed into the molten mixture. The corresponding amounts, and the equivalent amount of sodium in ppb with respect to polycarbonate, are listed in Table 2. By varying the ratio of diphenyl carbonate to bisphenol A, polycarbonates were produced which contained comparable terminal OH groups but which had different relative viscosities. These further results are given in Table 2.

TABLE 2

| Test | Rel. viscosity | ppm OH | Corresponding amount (g) Na-phenolate/h | ppb Na | Temp. of final reactor | Yl | ppm DPC |
|---|---|---|---|---|---|---|---|
| 9 | 1.207 | 290 | 0.0630 | 250 | 290 | 3.69 | 585 |
| 10 | 1.249 | 310 | 0.0315 | 125 | 310 | 3.77 | 378 |
| 11 | 1.251 | 310 | 0.0630 | 250 | 300 | 3.84 | 348 |
| 12 | 1.276 | 290 | 0.0630 | 250 | 310 | 4.00 | 288 |
| 13 | 1.287 | 260 | 0.0252 | 100 | 310 | 3.54 | 260 |
| 14 | 1.292 | 250 | 0.0252 | 100 | 310 | 3.38 | 232 |

Figure 1:
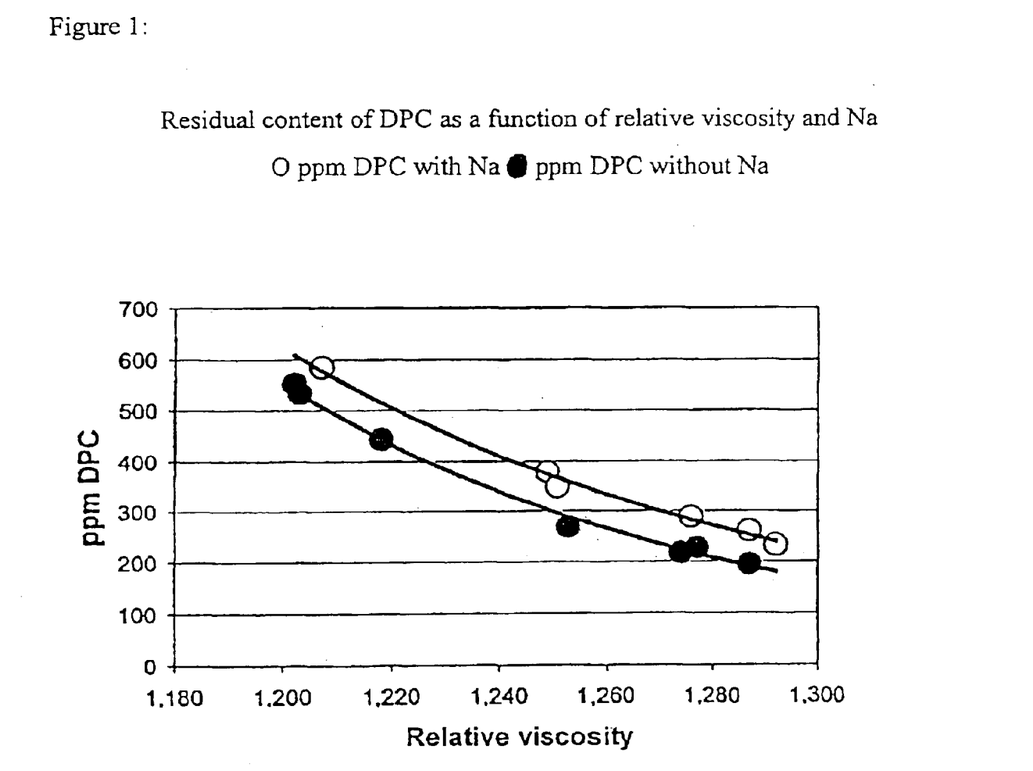
FIG. 1 is a graphic representation a the tested relationships between DPC content and the relative viscosity of the polycarbonate resins prepared.
Figure 2:
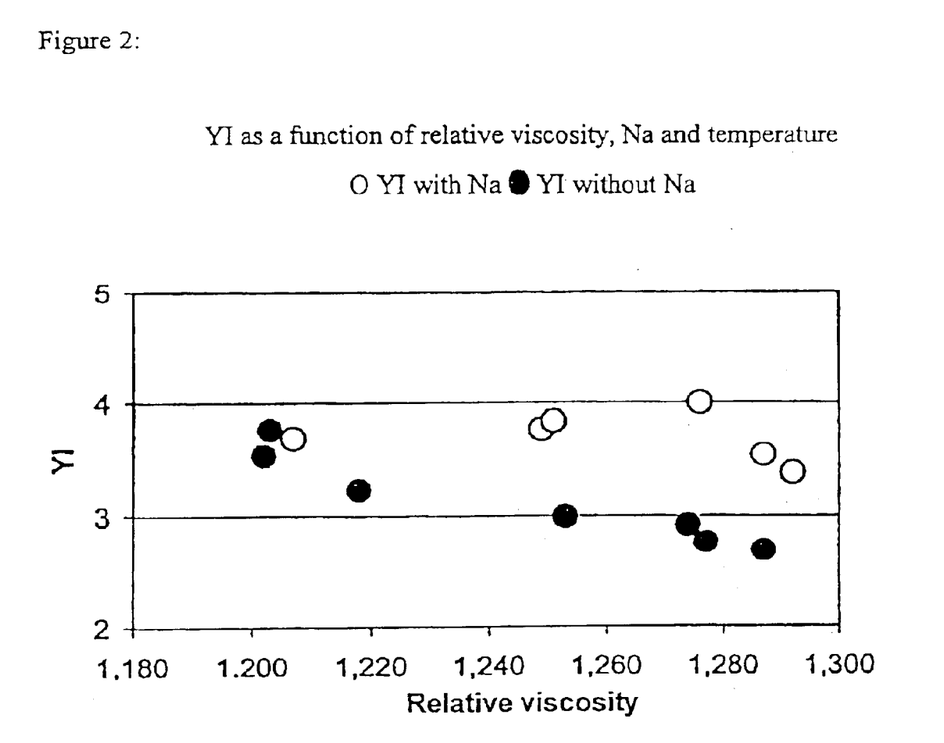
FIG. 2 is a graphic representation of the Yellowness Index as function of the relative viscosity of the polycarbonate resins prepared.
Figure 3:
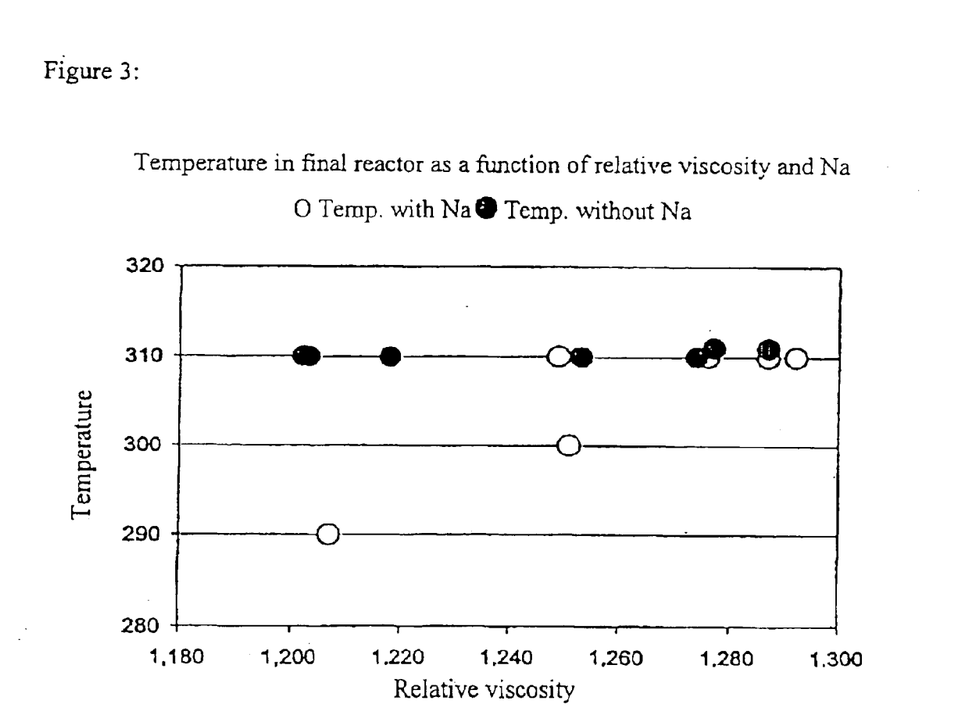
FIG. 3 is a graphic representation of the temperature in the final reactor as function of the relative viscosity of the polycarbonate resins prepared.

The test results are illustrated in FIGS. 1 to 3.

What is claimed is:

1. Continuous process for the production of polycarbonates by the transesterification of diaryl carbonates with dihydroxyaryl compounds characterised in that condensation is affected in the presence of quaternary onium compounds as catalysts, wherein the final polycondensation stage is affected without the further addition of catalyst, and in that an oligocarbonate is produced using quaternary onium compounds as catalysts which can be decomposed, substantially without leaving a residue, after preliminary condensation without separation of the monohydroxyaryl compound formed, and in a plurality of subsequent flash/evaporator stages in which the temperature is elevated stepwise and the pressure is decreased stepwise, which oligocarbonate is thereafter condensed to form the finished polycarbonate in one or two successive basket-type reactors, without the addition of further amounts of the catalyst used or of a new, different catalyst, whilst the temperature is further elevated and the pressure is further reduced.

2. Polycarbonate, characterised in that it can be obtained by the continuous process according to claim 1.

3. Polycarbonate according to claim 2, characterised in that it is low in alkali and alkaline-earth ions.

4. Polycarbonate according to claim 2, characterised in that incorporated cleavage and decomposition products from the transesterification process are not detectable.

5. Polycarbonate according to claim 2, characterised in that it contains less than 1 ppm of phosphorus.

6. Products made from polycarbonate, characterised in that they are produced from polycarbonate according to claim 2.

7. Storage media, characterised in that they are produced from a polycarbonate according to claim 2.

8. Process according to claim 1, characterised in that the onium compound is tetraphenylphosphonium phenolate.

9. Process according to claim 8, characterised in that the tetraphenylphosphonium phenolate is added in a phenolic solution.

10. Process according to claim 1, characterised in that the catalyst is used in amounts of $10^{-8}$ to $10^{-3}$ mol per mol bisphenol.

11. Process according to claim 1, characterised in that the reactors and apparatus as well as pumps, pipelines and fittings are produced from stainless steels of the type Cr NI (Mo) 18/10 for processing temperatures up to about 290° C. and are produced from Ni base alloys of type C for temperatures above about 290° C.

* * * * *